Patented Feb. 23, 1932

1,846,728

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF CRUDE AROMATIC COMPOUNDS

No Drawing.   Application filed October 26, 1927. Serial No. 228,977.

This invention relates to the purification of crude aromatic compounds such as crude anthracene, crude naphthalene and similar mixtures, and more particularly relates to the purification of crude aromatic compounds by selective catalytic oxidation.

The purification of the various crude aromatic hydrocarbons, such as for example crude anthracene, crude naphthalene and the like presents many difficulties, particularly in the case of anthracene, and has rendered the production of reasonably pure anthracene and its derivatives expensive and difficult. The present invention is particularly important in connection with the purification of crude anthracene of various grades, although it is in no sense limited in its application to this product. The coal tar fraction from which anthracene is recovered, and hence crude anthracenes themselves, contain varying amounts of the following impurities: phenanthrene, acenaphthene, diphenyl, methyl anthracene, pyrene, chrysene, retene, fluorene, fluoranthene, chrysogen, benzerythrene, carbazol, acridine, hydro-acridine bad smelling oils and the like. Hydrides of anthracene and phenanthrene are also present, as well as high boiling paraffins, such as eicosane, docosane and the like. Other impurities are sometimes also present in small amounts, and the relative proportions of the different impurities will vary somewhat with the nature of the coal from which the crude anthracene is produced. In addition to these hydrocarbons and heterocyclic compounds some oxygen-containing compounds such as alpha- and betanaphthol and other phenols of high boiling point are frequently present in the anthracene oil fraction of coal tar and are also present to a certain extent in some grades of crude anthracene. The impurities present in large quantity, however, are carbazole and phenanthrene.

Crude anthracene presscake, which may contain from 20 to 60 per cent of anthracene or even less, is usually purified by various methods of fractional solubility, or by causing some of the major impurities to react with chemicals which transform them into insoluble or non-volatile products which can then be easily separated. The processes at present in use for the most part either use solvents such as pyridine, solvent naphtha, creosote oil, petroleum hydrocarbons and the like, and by these methods the crude anthracene may be purified, leaving mainly carbazole and phenanthrene as impurities. The processes are very costly, and troublesome, and in the case of pyridine the odor is extremely unpleasant.

Another method which has been used in the past consists in removing carbazole by causing it to react with molten potassium hydroxide which combines with the carbazole to form a compound which is not volatile, and from which anthracene and phenanthrene can be removed by sublimation.

All of these processes are expensive, slow, and inefficient and require a great deal of labor, and they are also relatively dangerous for the workmen as the crude anthracene contains many compounds which are highly irritant to the skin, and the fumes which are given off, particularly when pyridine is used, are very disagreeable. A further serious drawback to the prior processes consists in the fact that only certain grades of anthracene could be used. Thus for example, certain coke oven tars produce crude anthracene having less than 24 per cent and sometimes as low as 14 to 16 per cent of anthracene. These products cannot be commercially purified by processes used hitherto. Moreover, when cannel coal or other paraffinoid coals are coked the resulting tar fractions contain considerable amounts of paraffines which are not satisfactorily removed by the previous methods of purification and render the raw material from these tars quite useless practically.

The present invention when applied to the purification of crude anthracene uses crude anthracenes of almost any grade, even down to 12 to 15 per cent anthracene, which is totally out of the question in any of the processes hitherto used. In the process of the present invention crude anthracene is vaporized and mixed with air, preferably by spraying into heated air, and the vaporized mixtures with air are passed over a suitable catalyst which favors total combustion of heterocyclic impurities and aliphatic compounds, but which does not attack anthracene to any considerable extent. A very large number of oxidation catalysts can be used, for surprising as it may seen, I have found that carbazol and other nitrogenous compounds which normally considered very stable compounds are substantially quantitatively burned in vapor phase in the presence of many oxidation catalysts under conditions which do not result in any considerable oxidation of the aromatic hydrocarbons.

After passing over the catalyst the product obtained is a high grade anthracene which may contain varying amounts of phenanthrene as the main impurity, depending on the catalyst used. Thus it is possible to use catalysts which not only burn out the carbazol and aliphatic compounds substantially quantitatively, but also burn up a good portion of the phenanthrene and other impurities present. It is difficult of course to remove all of the phenanthrene by catalytic oxidation without seriously attacking the anthracene, for although phenanthrene is more sensitive to oxidation catalysts than anthracene, its sensitivity is far less than carbazol and the other impurities and most catalysts which burn up substantially all of the phenanthrene will attack the anthracene to a certain extent. The amount of phenanthrene removed depends to a large extent on the market for phenanthrene and phenanthrene compounds and for the high grade anthracene which is obtained after a single selective catalytic oxidation which can be subjected to a single recrystallization, using a minimum amount of hot solvent naphtha, yielding anthracene of extraordinary purity from 90 to 99 per cent. Phenanthrene can be recovered in a very pure form from the mother liquor. The process of the present invention therefore not only permits obtaining cheaply and simply an anthracene of a purity not commercially available hitherto, but valuable by-products such as phenanthrene can also be obtained in a high state of purity whenever there is a demand for them.

Some of the other impurities present such as methylanthracene and the like, are oxidized to various compounds such as anthracene carboxylic acid and the like, and if $CO_2$ splitting catalysts are included they may be transformed into anthracene.

While the present invention is particularly applicable to the purification of anthracene press cake, which has not been subjected to any preliminary purification, it is also applicable and important for the purification of partially purified anthracene which has not reached the grade of ordinary commercially pure anthracene. Thus, for example, anthracene may be crystallized from solvent naphtha or toluene, which results in the separation of most of the phenanthrene and other soluble impurities but permits a considerable amount of carbazol to remain. This carbazol can be catalytically burned out in the present process with great efficiency and the present invention is therefore applicable and important for the purification of such preliminarily purified anthracene.

While the pyridine process of purifying anthracene is in most respects less desirable than the use of the present invention on crude anthracene press cake as it produces a bad smelling product instead of an odorless product as is produced by the preferred embodiment of the present invention, the principles of selective catalytic combustion of impurities, such as carbazol can be combined with a treatment with pyridine or similar solvent of anthracene. In such a case the anthracene is dissolved and a mixture remains containing phenanthrene together with large amounts of carbazol. The present invention is excellently applicable to the purification of such phenanthrene carbazol mixtures and permits substantially quantitative removal of carbazol without causing any serious losses of phenanthrene. Similarly, mixtures containing anthracene or phenanthrene and carbazol made by other processes can be treated with advantage by the present invention.

In a similar manner crude naphthalene may be purified by selective catalytic oxidation of the impurities such as phenolic bodies and this process is particularly effective in connection with the air oxidation of naphthalene, as the purified naphthalene vapors mixed with further quantities of air if necessary can be directly oxidized catalytically to valuable products such as alphanaphthaquinone, phthalic anhydride, maleic acid and the like, without separation of the purified naphthalene.

The process of the present invention is also applicable to crude benzol fractions such as crude light oil, and by suitable choice of catalysts it is possible in some cases to remove aliphatic, alicyclic and heterocyclic compounds present as impurities. Other mixtures of organic compounds may be purified by the present process, and it should be understood that the above referred to products, namely, crude anthracenes, crude phenanthrenes, crude naphthalenes and the various light oil fractions, are illustrations only of products which can be purified by the present process.

While any suitable oxidation catalyst can be used which has a selective oxidizing effect on impurities present, I have found that the most effective catalysts to be used are the so-called stabilized catalysts, that is to say, catalysts which contain in addition to the specific catalytic elements, compounds of the alkali metals, alkaline earth metals and some earth metals characterized by the formation of difficultly reducible oxides, and which exercise a stabilizing or moderating action on the catalyst and prevent or moderate its activity in oxidizing such organic compounds as anthracene, naphthalene, phenanthrene, acenaphthene, benzol, toluol and the like. These stabilized catalysts may also contain other catalytically active components which, however, are not specific catalysts for the purification reaction, and which I have called stabilizer promoters, as they appear to tune or promote the action of the stabilizers present. The oxidation of organic compounds by means of stabilized catalysts, and the catalysts, are described in detail in my Patent No. 1,709,853, dated April 23, 1929, of which the present application is in part a continuation, and it should be understood that any of the suitable stabilized catalysts there described can be used in the present invention. I have found that some very effective stabilized catalysts are those which contain the catalytically active components associated with or chemically combined in or with base exchange bodies, both zeolites and non-silicious bodies, which catalysts and processes of oxidizing compounds therewith are described in my co-pending applications, Serial No. 211,638, filed August 8, 1927; and Serial No. 215,759, filed August 26, 1927, and my Patent No. 1,694,122, dated December 4, 1928, of which applications and patent the present application is also in part a continuation.

In addition to stabilized catalysts of the character described in my prior applications above referred to I have found that for this particular reaction many effective catalysts can be used in which instead of the catalytic component being predominant the stabilizer component is predominant, particularly where the stabilizer is a powerful alkali. Thus I have found that catalysts containing a major portion of a strong alkali, such as oxides or hydroxides of the alkali metals or alkaline earth metals associated with relatively minor amounts of specific catalytically active components, are very effective for the present invention, and in particular I have found that certain of these stabilized catalysts containing a strongly alkaline stabilizer in predominant amounts are particularly effective in the purification of crude anthracene when it is desired to remove substantially all of the carbazol without breaking up large amounts of phenanthrene. It is not definitely proven just what the action of these strongly alkaline stabilized catalysts may be.

While the primary purpose of the present invention is to purify mixtures of organic compounds by selective oxidation of impurities it should be understood that the reaction products which may not be completely pure may be used as such, for example by further oxidizing them to useful products, as has been described in connection with the purification of naphthalene, and as is of course applicable to the purification of anthracene also where the phenanthrene present is unobjectionable. The further oxidation may take place in a separate converter or in the same converter, by a suitable arrangement of catalysts or catalyst zones.

The reaction conditions, such as temperature, amount of air or other oxidizing gas present, time of contact, loading, and the like, will vary with different organic compounds and with different catalysts and in some cases the reaction conditions will also vary with the desired product. The invention is therefore not limited to particular reaction conditions in all cases, and in the specific examples to follow certain typical reaction conditions will be described with particular catalysts. The invention will be described in greater detail in the specific examples which follow, and which are illustrations of the scope thereof, but in no sense limit the invention.

*Example 1*

17.5 parts of a compound containing iron titanium oxides such as for example ilmenite are suspended in 150 parts of water in the form of a fine powder. 8 parts of 100% KOH are then dissolved in the suspension which is coated onto 200 to 300 volumes of pea sized pumice stone fragments which are then calcined with air at 400–500° C. The catalyst obtained is stabilized by KOH and is well adapted for catalytic purification of crude naphthalene and anthracene by selective oxidation of the impurities.

Vapors of 30–35% crude anthracene uniformly vaporized by spraying into a current of air at 200–260° C. in a ratio of one part crude anthracene to 20–30 parts air by weight are passed over the contact mass at 380–440° C. High yields of 70–80% pure anthracene are obtained containing as its main impurity phenanthrene accompanied only by small amounts of carbazol. Most of the carbazol present in the original crude material is decomposed to carbon dioxide, water and nitrogen.

Crude anthracene vapors from a product containing 27–35% anthracene are submitted to the reaction conditions described above. At a reaction temperature of 400° C. a purified anthracene is obtained containing about 71.41% anthracene, no anthraquinone and only traces of carbazol. After a single recrystallization from the minimum of toluol an anthracene of 95.82% purity is obtained. When the reaction temperature is increased to 420–440° C. a reaction product is obtained containing from 74.4–75% anthracene, no anthraquinone and no carbazol. After a single recrystallization from a minimum amount of toluol an anthracene of 96.89% purity is obtained.

The KOH used can be substituted wholly or partially by an equivalent amount of other stabilizers, such as SrO, NaOH or $K_2CO_3$, singly or in admixture. The reaction conditions can also be varied somewhat with the quality of the crude anthracene used.

Mixtures of iron oxide with oxides other than titanium oxide may also be successfully used as contact mass when stabilized by KOH as described above. Thus titanium oxide can be replaced partially or wholly by $Al_2O_3$, $ZrO_2$, $CeO_2$, $ThO_2$, $CoO_2$, NiO, singly or in admixture. The KOH can also be substituted by equivalent amounts of other stabilizers, such as NaOH, RbOH, CsOH, singly or in admixture.

The reaction can be carried out in various types of converters, such as bath converters and non-bath converters. Excellent results are obtained in converters which are so constructed as to permit fairly close control of the reaction temperature.

*Example 2*

14 parts of $CeO_2$ are suspended in a solution of 10 parts $KNO_3$ and 150 parts of water. This suspension is then coated onto 200 volumes of pumice or aluminum granules in the usual manner following by drying and calcining. The stabilized contact mass thus produced is well adapted for the catalytic purification of crude anthracene and other crude aromatic hydrocarbons of various grades of impurity. The reaction conditions may be varied widely without serious disadvantage to the effective catalytic purification of the crude aromatic hydrocarbons by selective oxidation of the impurities. Among these conditions are the temperature, pressure, time of contact, concentration of gases, and amount of catalyst.

Very favorable results are obtained by uniformly vaporizing crude anthracene presscake with air in the ratio of 1:26 by weight, the vapors being then passed over the contact mass at 360–440° C. resulting in a purified anthracene, which contains phenanthrene, together with small amounts of carbazol. Thus, for example, 60 volumes of the contact mass may be placed in a tubular converter, for example one cooled by means of a boiling bath allowing exact control of the reaction temperature. The contact mass is preferably filled into the tubes to a height of 20–40 cm. and is loaded with 4–5 parts by weight of crude anthracene per hour (in the case of a crude product containing about 28–35% anthracene). When the reaction temperature is maintained at about 380° C. the purified anthracene obtained contains 74% of anthracene, no anthraquinone and 1.38% carbazol. When the reaction temperature is raised to 400° C. the anthracene of 77.2% purity is obtained, which contains no anthraquinone and only traces of carbazol. At higher temperature traces of anthraquinone may be noted.

When the purified anthracene is recrystallized from toluol using the minimum amount to effect solution at 80–90° C., cooling down to 15° C., a product is obtained which contains 96–97% anthracene, the remainder being substantially all phenanthrene. The recrystallized product is gray-white and of excellent appearance. The product can be submitted to a second recrystallization from toluol resulting in practically pure anthracene of a beautiful white color and analyzes 99–99.9% pure.

The mother liquor from the recrystallization process can be distilled to remove the solvent and then a high grade phenanthrene containing small amounts of anthracene is practically the only impurity. This phenanthrene can be used for many purposes, for example, catalytic oxidation of phenanthrene which is a valuable intermediate in the dyestuff industry.

*Example 3*

8.7 parts of $Fe_2O_3$ freshly precipitated from the corresponding salts by means of alkali are mixed with 8 parts of $TiO_2$ in the form of a finely ground powder, the $TiO_2$ being also freshly precipitated from titanium salt solutions. The mixture of the oxides is suspended in 100 parts of water and 14.2 volumes of 10 N. KOH solution are then added. The suspension is coated onto 200–250 volumes of pea-sized pumice fragments in the usual manner and then calcining at 400–500° C. The stabilized catalyst obtained is well adapted for the catalytic purification of crude anthracenes of various grades of purity and a substantially complete total combustion of the carbazol is obtained under proper reaction conditions.

Crude anthracene obtained by various methods and containing different percentages of anthracene such as for example anthracene presscake from a filter press or a hydraulic press or crude anthracene resulting from the washing of anthracene presscake at room temperatures or higher or crude anthracene obtained by centrifuging and washed or recrystallized from solvents, such as for example benzol, toluol, solvent naphtha, creosote oil, carbonsulfide, acetone, carbon tetrachloride, gasoline, pyridine, and quinoline bases may be used in the process. Crude anthracene containing about 30% of anthracene, 22% of carbazol and 46–48% of phenanthrene is uniformly vaporized into an air stream in the ratio of 1:15 to 1:30 and passed over the contact mass of 380–440° C. When the reaction temperature is 380° C. a product is obtained which contains about 3.5% carbazol. At 400° C. the product contains only 1.38% carbazol and at temperatures of 420–440° C. no trace of carbazol can be detected by the Kjeldahl method. The reaction product, therefore, consists substantially of anthracene and phenanthrene, which latter can be easily separated by recrystallization with a minimum amount of coal tar solvent, such as solvent naphtha or toluol, resulting in an anthracene which is from 95.8 to 96.9% pure. From the mother liquor of the recrystallization process a very pure phenanthrene can be recovered and is particularly useful for catalytic oxidation to phenanthraquinone, diphenic acid and maleic acid. The amount of phenanthrene which is recovered will depend on the reaction conditions which can be so varied that phenanthrene is either recovered to a very large extent or is partially burned out. Thus, reaction products containing different ratios of anthracene and phenanthrene can be obtained. When the reaction is carried out at 380° C. the reaction product obtained contains 62–68% of anthracene, the remainder being mostly phenanthrene. At temperatures between 400–440° C. the reaction product contains between 70 and 75% anthracene, showing that considerable amounts of phenanthrene have been burned. It will be apparent from the above that the temperature is an important reaction condition and determines the extent to which the carbazol and part of the phenanthrene is removed from the crude anthracene by combustion. It also shows that a reliable control of the heat evolved in the reaction is important, particularly where large amounts of phenanthrene are to be recovered.

The contact mass used may be varied. Thus, for example $Fe_2O_3$ may be partly replaced by CuO, NiO and particularly CoO. The titanic oxide can be partly or wholly replaced by $Al_2O_3$, $ZrO_2$, $CeO_2$, $ThO_2$, or CdO singly or in admixture and stabilizers other than KOH, may be used such as $K_2CO_3$, $KNO_3$, KCN, NaOH or $Na_2CO_3$, singly or in admixture.

*Example 4*

Crude anthracene containing about 30% anthracene as described in Example 3 is recrystallized from crude solvent naphtha by dissolving at about 80° C. and then cooling to about 25–30° C. A crude anthracene is obtained which contains from 59–61% anthracene, 34–36% carbazol and 4–5% phenanthrene. This crude material containing as its main impurity a large amount of carbazol is passed over the contact mass described in Example 3 under the reaction conditions therein set forth. An anthracene is obtained which is 94–98% pure and of a very light color. The yields are very high. By subjecting this purified anthracene to a recrystallization from toluol or solvent naphtha or any other well known solvents for anthracene recrystallizationss which have large solvent powers for phenanthrene a practically pure anthracene is obtained in the form of small white glistening plates possessing a violet fluorescence and melting at 214–216° C.

The mother liquor from the recrystallization of the crude anthracene is distilled to remove solvent naphtha, leaving a mixture containing about 7.5–8.5% anthracene, 10.5–11.5% carbazol and 80–82% phenanthrene. This mixture can be submitted to catalytic purification under the reaction conditions described above in order to burn out the carbazol. A very pure phenanthrene is obtained analyzing over 90% and containing anthracene as its sole impurity. By recrystallizing from alcohol a practically white phenanthrene is obtained which melts between 96–100° C.

*Example 5*

A 30% crude anthracene is recrystallized from solvent naphtha resulting in a product containing 60% anthracene, 35% carbazol and 5% phenanthrene. This is again crystallized from a pyridine solvent by dissolving at 80° C. and cooling down to 15° C. followed by filtration. A product is obtained containing about 85% anthracene, 13.3% of carbazol and 1.7% anthracene. This mixture is then submitted to catalytic purification as described in the foregoing example, using a temperature above 400° C. The carbazol is burned out and an anthracene of 99% purity results. The mother liquors from the pyridine base recrystallization containing about 16.2% anthracene, 72.3% carbazol, and 11.5% phenanthrene can be catalytically oxidized in the vapor phase and produces small amounts of anthraquinone and large amounts of maleic acid, the latter being produced by the partial oxidation of carbazol and phenanthrene. The catalytic oxidation must take place with well toned catalysts using air or gases diluted with oxygen, particularly in the circulatory process.

*Example 6*

16 parts of freshly precipitated ferric oxide are suspended in 150 parts of water, and 25 parts of $KNO_3$ are dissolved in the suspension. 200 volumes of pea sized pumice fragments are impregnated with the suspension in the usual manner and dried. The preferred method of impregnating or coating the pumice fragments consists in heating the fragments to a temperature above the boiling point of water and then spraying the suspension onto them with continuous stirring. A uniform coating is obtained thereby, the water being continuously driven off.

The stabilized contact mass thus obtained is placed in a converter, preferably one containing a plurality of relatively small reaction zones arranged in a medium of high heat conductivity, such as molten metal baths or alloy baths, as for example lead, mercury-cadmium, mercury-lead, or fused salts, such as mixtures of sodium and potassium nitrates or both nitrites and nitrates. A very desirable type of converter to use is one which consists of a plurality of small tubes surrounded by a bath, the diameter of the tubes being between 1 and 3 cm. A metal or alloy bath may be used which, preferably, boils at about the reaction temperature desired, or sufficiently high to maintain the reaction temperature. The boiling points of the bath may be varied by changing the pressure under which it boils or by changing the composition of the bath in the case of an alloy bath.

Bath converters are not essential, and converter constructions containing provisions for automatic cooling by the reaction gases with or without heat equalizing means of high heat conductivity interspersed through the catalyst may also be used with great effectiveness.

Crude anthracene of 25 to 35% anthracene content, especially those obtained from sources which result in a considerable paraffine content, as for example from gas tar formed in the distillation of coal containing considerable quantities of cannel coal or other paraffinoid coals is uniformly vaporized by spraying into a current of air which is heated up to 200 to 250° C., the ratio being one part by weight of crude anthracene to 15–40 parts of air. The vapors are lead over the contact mass at 360–440° C., and give yields of purified anthracene amounting to between 90 and 95 per cent of the theory. At 360° C. the product when analyzed shows 72.89 per cent anthracene, no anthraquinone and 5.8 per cent carbazol the remainder being mainly phenanthrene. At 380° C. the anthracene content is about 75%, no anthraquinone is present, and the carbazol content drops to 4%. This mixture when recrystallized using minimum amounts of toluol or solvent naphtha, gives a 91.8% pure anthracene. When the temperature is raised to 400–440° C. the product obtained contains from 77–80.27% anthracent, no anthraquinone, and from 1.8 per cent–no per cent carbazol. After one recrystallization a 94.09–96.63% pure anthracene is obtained of excellent quality, showing only a slight grayish shade. It should be noted that crude anthracenes, such as those described above, have hitherto been considered completely unsuitable for commercial purification.

The catalytic purification described above results in substantially burning out the carbazol and also burning out the phenanthrene to a great extent. The purified anthracene as it comes from the converter contains a yellow body which is probably chrysogen, and which is eliminated by the subsequent recrystallization from coal tar solvents. No oil is noticeable in the product from the converter. The crude anthracenes used in the above purification usually contain several per cent of water, and apparently this water content does not adversely affect the catalytic purification and of course is removed with the waste gases. A further desirable feature of the product consists in the complete absence of bad odor, even in the product directly obtained from the converter. The analytical results show that the carbazol is substantially completely burned out under proper reaction conditions and that also the paraffines and the liquid lubricating oils which may be contain phenols and other impurities are burned out as well, which is an added advantage of the present invention.

Instead of using crude anthracene directly, as described above, the crude anthracene may be given preliminary treatments in order to produce crudes of higher anthracene percentage. Thus for example when a crude anthracene containing from 40–60 per cent of anthracene obtained for example by recrystallization from a suitable solvent, is submitted to catalytic purification with the contact mass described in this example, 90–94 per cent pure anthracene is obtained directly. This anthracene is sufficiently pure to be used directly for the manufacture of anthraquinone, either by catalytic oxidation, by electrolytic oxidation, or by the chromic acid oxidation process. Anthraquinones of excellent purity can be thus obtained and it is unnecessary to recrystallize them from solvent naphtha, creosote oil, petroleum, ether, or the like.

The ratios and components of the contact masses may be varied to produce similar highly effective contact masses. Thus, $Fe_2O_3$ can be partly or wholly replaced by silver compounds, gold compounds, or copper oxide made from 54.4–60 parts of copper nitrate plus $3H_2O$. NiO freshly prepared from 60–70 parts of nickel nitrate, CoO prepared from 70–80 parts of cobalt nitrate, plus $6H_2O$ may also be used. These alternative components may of course be used singly or in admixture. Instead of using the oxides, various compounds of the elements referred to are also very effective, and I have found that oxides and compounds of the platinum group may also be used, singly or in admixture, with one or more of the components described above.

The stabilizer of the contact mass may also be varied. Thus for example, the $KNO_3$ may be substituted partly or wholly by KOH, $K_2SO_4$, $KHSO_4$, KCN, $K_2CO_3$, KCL, $KClO_3$, KBr, KF, the various potassium phosphates, NaOH, $NaNO_3$, $Na_2SO_4$, NaCl, NaBr, NaF, mixtures of alkali metal and alkaline earth metal oxides, hydroxides, salts and other compounds. Complex compounds of the catalytic element and stabilizers are also especially effective, such as for example potassium ferricyanide, copper ferricyanide, together with a stabilizer. Various silicates in which the catalytically effective element may be a silicate or the stabilizer may be a silicate, or both may be chemically combined.

When using the modification in which copper oxide stabilized with KOH or $KNO_3$ forms the catalyst, 30–35 per cent crude anthracene treated at 400–440° C. under the reaction conditions described above produces a product containing from 0.5 to 0.7% carbazol and 70.49 per cent anthracene. After recrystallization from solvent naphtha the anthracene is about 95.79 per cent pure. Occasionally appreciable amounts of anthraquinone may be noted in the anthracene, but wherever any anthraquinone is present the analyses have shown that the carbazol percentage is never high. A certain amount of anthraquinone does not do any harm when the anthracene is to be used for making anthraquinone, as in this case the small percentages of anthraquinone present cannot be considered as impurities. The yields are over 90 per cent of the theory.

An NiO-KOH catalyst when used with 30 per cent crude anthracene at 400° C. under the reaction conditions enumerated above yields a product containing 74.99% anthracene, no anthraquinone and 1.6% carbazol by the Kjeldahl method, the remainder being phenanthrene.

CoO-KOH and $CoO-KNO_3$ catalysts also produce excellent contact masses. When 30 per cent crude anthracene vaporized uniformly into air in the ratio of 1:25, is led over these contact masses at 360° C. a product is obtained containing 72.57% anthracene, no anthraquinone and 3.6% carbazol; at 380° C. the anthracene percentage is 73.34 with no anthraquinone and 0.96% carbazol. After recrystallization a 95.60% pure anthracene is obtained. When the temperature is raised to 400° C. the product contains 75.12% anthracene, no anthraquinone and only traces of carbazol the remaining per cent being substantially phenanthrene, which can be removed by recrystallization processes or by washing out the phenanthrene from the reaction product with well known solvents. The phenanthrene can be obtained by distilling off the solvent, and possesses a purity of from 90 to 94 per cent.

The contact masses described in this example can be further toned by the addition of dehydration and dehydrogenation catalysts. The additional catalytic component may for example consist of various amounts of $Al_2O_3$, $ZrO_2$, $CeO_2$, $ThO_2$, CeO, ZnO, $MnO_2$, and $PbO_2$, singly or in admixtures. A further modification which enhances the catalytic effectiveness of the contact masses, particularly for the total combustion of the carbazol are the oxides, salts and other compounds of the elements of the fifth and sixth groups of the periodic system, such as V, Ta, Bi, Sb, Cr, Mo, W, U. Compounds of these elements may be added singly or in admixture, but preferably the additions should be present only in small quantities.

Example 7

5 parts of $Al_2O_3$ thoroughly mixed with 7 parts of $ThO_2$ are suspended in 150 volumes of $NaNO_3$ solution and 200 volumes of pea sized pumice fragments are impregnated with the suspension and calcined.

Crude anthracene is uniformly vaporized into air in the ratio of 1:20 by weight and is passed over the above described stabilized catalyst at 360–420° C. Part of the phenanthrene and most of the carbazol and other impurities, such as traces of paraffin, phenolic bodies, acridine, diphenylene oxide, phenylnaphthyl carbazol, fluoranthrene are selectively burned out so that when the product has been subjected to a single crystallization from solvent naphtha or acetone a high grade anthracene is obtained which may be directly used for the manufacture of anthraquinone by the well known manufacturing methods.

The oxides in the contact mass can be partly or wholly replaced by other oxides, such as, $ZrO_2$, ZnO, CdO, $SnO_2$, $WO_5$, $Cr_2O_3$, $SiO_2$, $TiO_2$, BeO, $UO_2$, $Mo_2O_5$, MnO, MgO, BaO, singly or in admixture. The stabilizer in the contact mass is $NaNO_3$, which can be partly or wholly replaced by other alkali metal salts, hydroxides and oxides, particularly when mixed with alkaline earth oxides or hydroxides. Small percentages of salts of the elements of the 5th and 6th groups of the periodic system may be added to enhance the catalytic efficiency of the contact mass described. Such salts are for example, $AgVO_3$, $Al_4(V_2O_7)_3$, $CeV_2O_7$, $FeVO_4$, and the corresponding salts of tantalum, molybdenum, tungsten, and hexavalent uranium.

Example 8

16–18 parts of freshly precipitated $TiO_2$ as commercially available are suspended in 50 cc. of water containing 6–10 parts of KOH, KCN, $KNO_3$, singly or in admixture. The suspension is then coated onto 200 volumes of pea sized pumice fragments in the usual manner.

30% crude anthracene, uniformly vaporized with air, for example in ratio of 1:25 by weight, when passed over the contact mass at 360° C. yields a product containing 72.88% anthracene, no anthraquinone and 5.93% carbazol, the remainder being phenanthrene. At 380° C. the product contains 66.65% anthracene, no anthraquinone, 3.93% carbazol, and the remainder phenanthrene. At 390° C. the product contains 70.09% anthracene, no anthraquinone, 2.76% carbazol and the remainder phenanthrene. This reaction product when recrystallized from toluol yields 95.08% pure anthracene. At 400° C. the product contains 68.69% anthracene, no antharquinone, 2.35% carbazol, and the remainder phenanthrene. At 420° C. the product contains anthracene 69.94%, no anthraquinone, carbazol 1.04% and the remainder phenanthrene.

Example 9

36 parts of $V_2O_5$ are dissolved in 33.6 parts of 100% KOH in 900 volumes of water. 290 parts of bag house super-cel grade of Celite are stirred into the solution at room temperature. 52.8 parts of ferric sulfate are dissolved in 300 parts of water at room temperature. A potassium vanadate-Celite suspension is then made neutral to litmus by a suitable amount of 2 N. sulfonic acid. To the suspension is gradually added a ferric sulfate solution at room temperature with vigorous stirring is made neutral to litmus by the addition of 10 N. KOH, filtered, washed, and dried at 100° C. 88.8 parts of aluminum sulfate with $18H_2O$ are dissolved in 600 volumes of water and 450 cc. of 2 N. KOH are added to bring the solution to neutrality to litmus at room temperature, the aluminum hydroxide being filtered off and washed. 50.7 parts of 100% KOH and 60 volumes of water are added to the wet aluminum hydroxide cake which effects ready solution at room temperature. The potassium aluminate solution is mixed with the potassium vanadate-Celite powder and thoroughly mixed in a mortar whereupon 123 parts of 33° Bé. potassium silicate solution is added to the mixture, thoroughly incorporated and the whole mass immediately made up into pellets and dried at 80° C. The contact mass is a zeolite-like body containing iron vanadate and Celite embodied therein.

Crude anthracene containing 35% anthracene is uniformly vaporized in an air stream in the ratio of 1:40 by weight and passed over the contact mass at 340° C., yielding a product which contains 61.76% anthracene, 8.8% anthraquinone, only traces of carbazol, and the remainder mostly phenanthrene.

Example 10

12 parts of $V_2O_5$ are dissolved in 10 parts of KOH diluted to produce a solution of 115 volumes. 22 parts of aluminum sulfate with $18H_2O$ are treated with ammonia to precipitate aluminum hydroxide, filtered in a Buechner funnel and then dissolved in 14 parts of 90 parts KOH and 60 parts of water. The two solutions are then poured together and 97 parts of kieselguhr kneaded with them. The wet mixture is then formed into pellets dried in an atmosphere rich in $CO_2$, thereby producing a diluted base exchange body containing $V_2O_5$ and $Al_2O_3$ in non-exchangeable form. The contact mass is then calcined at 400–500° C. first with air and then with burner gases containing 3–7% $SO_2$.

30–32% crude anthracene is uniformly vaporized into air to bring all the constituents in the vapor phase, the ratio being from 1:35 to 1:45 by weight. The vapor-air mixture is then passed over the contact mass at 360° C. resulting in a reaction product containing 64.88% anthracene, no anthraquinone, only traces of carbazol, and the remainder phenanthrene. After a single recrystallization, using toluol as a solvent, an anthracene of 93.93% purity is obtained and after a second recrystallization the product is practically chemically pure anthracene. This shows that the only impurity contained in the product from the converter is phenanthrene which is separated in the recrystallization process due to its high solubility in the coal tar solvents used.

Example 11

14.4 parts of $V_2O_5$ are suspended in 200 parts of water to form a slurry and then after warming to 60–70° C. are dissolved by means of 22 parts by volume of 10 N. potassium hydroxide solution to form potassium vanadate.

14.8 parts of manganese sulphate with 2 mols of water are dissolved in 200 parts of water and then poured into the potassium vanadate solution with vigorous agitation followed by warming to 40–50° C. and neutralized to litmus by means of 2 N. sulphuric acid. The brownish precipitate which forms is filtered or thoroughly washed with water whereupon the wet precipitate is suspended in a solution of 10 parts of potassium bromide in 200 parts of water. The suspension thus produced is sprayed onto 400 volume parts of pea-size pumice fragments uniformly by vaporizing the water used for the suspension.

The stabilized catalyst thus obtained is filled into a converter which consists of a plurality of small size tubes surrounded by a metal bath, and vapors of crude anthracene presscake containing 25–35% of crude anthracene and mixed with air in the proportion of 1:18, are passed over the catalyst at 370–420° C.

The reaction product contains from 62–70% anthracene, depending on the amount of contact mass used. When the time of contact is increased to about half a second, the reaction product contains from 70–80% anthracene, and when analyzed by the Kjeldahl method shows that the carbazol originally present is substantially all consumed. The product, therefore, consists mainly of anthracene and phenanthrene, the amount of the latter being somewhat lower than in the original raw material and depending on the reaction conditions. It is evident, therefore, that some of the phenanthrene is also consumed in the reaction while little if any of the anthracene is attacked. After a single recrystallization from solvent naphtha, 90–95% anthracene is obtained and a high percentage phenanthrene can be obtained from the mother liquors by distilling off of the solvent. The yields of anthracene approach the theoretical.

Similar results can be obtained from contact masses containing vanadates of iron, cobalt, nickel, titanium, aluminum, copper, silver, or lead, singly or in admixture. The stabilizer used can be substituted partly or wholly by other stabilizers, such as for example one or more of the following: potassium nitrite, potassium nitrate, potassium chloride, potassium fluoride, potassium acid fluoride, potassium hydrogen sulphate, potassium sulphate, sodium hydrogen phosphate, potassium hydroxide, sodium carbonate, potassium cyanide. The amount of the stabilizers used will vary somewhat with the catalysts and with the particular stabilizer. The reaction conditions may also be adjusted as to temperature, time of contact, pressure, catalyst loading and ratio of crude anthracene to air. The contact masses described above may be used under similar reaction conditions for the purification of crude benzene and toluene fractions directly obtained from light oil. In the process the impurities are selectively oxidized, particularly aliphatic hydrocarbons, such as pentane, hexane, amylene hexylene, heptylene, octylene; alicyclic compounds such as cyclopentadiene, dicyclicpentadiene, di- and tetrahydrobenzene, heterocyclic compounds such as for example pyrrol, pyridine, thiophene, thiotolene, etc. Phenols are also readily attacked and substantially burned out.

*Example 12*

22 parts of basic copper carbonate are dissolved in the form of the cuprammonium compound.

10.2 parts of freshly precipitated aluminum hydroxide are dissolved up in sufficient 2 N. sodium or potassium hydroxide solution to form a clear sodium or potassium aluminate solution. 24 parts of copper nitrate containing 3 mols of water are dissolved in 100 parts of water.

The cuprammonium carbonate and the aluminate solution are then mixed together and 100 parts of kieselguhr are introduced with vigorous agitation, or 150 parts of quartz or pumice meal may be substituted therefor. The copper nitrate solution is then poured into the mixture with vigorous agitation and a gelatinous blue product forms which is neutral or slightly alkaline to phenolphthalein.

The product is a base exchange body containing sodium or potassium, copper and aluminum, and is diluted with material rich in kieselguhr. The gel is pressed and dried at temperatures under 100° C. and then broken into fragments. If the fragments do not possess sufficient strength they may be treated with 5-10% diluted potassium waterglass solution and dried again.

Instead of using the contact masses as described, the diluted and undiluted contact masses may be coated onto fragments of pumice or quartz by means of a waterglass solution and can then be used effectively as contact masses, especially if such undiluted base exchange bodies are applied.

The contact masses described are well suited for the catalytic purification of various grades of crude anthracene containing from 20 to 75% of anthracene to produce high grade anthracene, the main impurities, such as carbazol, being substantially burned out and a large amount of impurities such as phenanthrene being also consumed. When crude anthracene containing 25-75% or preferably 40-50% anthracene presscake is uniformly vaporized with air in the ratio of 1:20 and is led over the contact mass at 380-430° C., a purified anthracene is obtained containing between 75-80% of anthracene, practically no carbazol, and a remainder which can be considered as phenanthrene. After recrystallization from an amount of solvent naphtha just sufficient to dissolve the purified anthracene at 80° C. followed by cooling down to 15° C., an anthracene is obtained which is about 95-97% pure, practically colorless and of excellent quality.

*Example 13*

The following mixtures are prepared:
1. 50 parts of freshly precipitated iron hydroxide are prepared by adding 5 to 6% ammonia to a 10 to 15% ferric nitrate solution at 40 to 50° C. until the reaction is ammoniacal. The finely divided iron hydroxide is then carefully washed with distilled water to remove the ammonium nitrate and dried at temperatures below 100° C.

2. 24 parts of lead dioxide in the form of sodium plumbite are dissolved in water to form a 10% solution.

3. 3 parts of freshly precipitated aluminum hydroxide are dissolved up with 2 N. potassium hydroxide to form potassium aluminate.

4. 18 parts of thorium nitrate containing 12 mols of water are dissolved in 100 parts of water.

5. 25 parts of copper nitrate containing 3 mols of water are dissolved in 100 parts of water. Instead of using copper nitrate alone a corresponding mixture of copper nitrate and nickel nitrate or copper nitrate nickel nitrate and cobalt nitrate can be used.

The freshly precipitated iron hydroxide is kneaded into the plumbite and aluminate solution and then the thorium nitrate and copper nitrate solutions added. The reaction product obtained is thoroughly pressed and dried at 80-90° C. followed by fragmentation.

The product is a contact mass containing potassium, sodium, aluminum, thorium, lead and copper highly diluted with freshly precipitated iron oxide and is well suited for the catalytic oxidation of the impurities of crude anthracene, especially for the total combustion of carbazol whereby a high grade anthracene is obtained. Anthracene presscake of 26–35% anthracene is uniformly vaporized with air in the ratio of 1:30 and 35 and passed over the contact mass at 380 to 420° C. whereby a 75 to 80% anthracene is immediately obtained containing as the main impurity phenanthrene which latter can easily be separated from anthracene by recrystallization using well known solvents such as toluol, solvent naphtha, etc. The anthracene after a single recrystallization is of excellent quality containing between 95–97% anthracene and once more recrystallized is nearly chemically pure.

*Example 14*

1. A solution containing 48 to 96 parts of $SiO_2$ in the form of ordinary potassium waterglass solution of 33 to 36° Bé. is diluted with 10 to 12 times its volume of water and sufficient 20% ammonia water is then added until the cloudiness which has formed is cleared up.

2. 39 parts of $Cu(NO)_3 \cdot 6H_2O$ are dissolved in water to form a N/10 solution and sufficient concentrated ammonia water is added until the precipitate which first forms again dissolves.

The deep blue copper solution is then poured into the first solution with vigorous stirring.

A sufficient amount of aluminum nitrate solution containing about 10% $Al(NO_3)_3$ is prepared. This aluminum nitrate solution is then gradually added to the mixture of the waterglass and cuprammonium complex solution until the reaction mixture is just neutral to phenolphthalein.

The reaction product consists of a deep blue gel which is pressed and dried thereby forming greenish blue fragments of conchoidal fracture which disintegrates into small pieces in hot water.

The cuprammonium complex in this example can also be replaced wholly or partly by other complex compounds such as nickel or cobalt complexes.

The aluminum nitrate in this example can also be replaced partly or wholly by other metal salt solutions such as copper, nickel, iron, manganese, cobalt, silver, lead, singly or in admixture.

In many cases it is advantageous to introduce calcium by base exchange in these three component zeolites obtained, the potassium of the base exchanging part being partly replaced thereby. Before introducing calcium it is advantageous first to trickle water over the base exchange body for hydration purposes. All the bodies obtained by this method are more or less very effective catalysts for the selective purification of different grades of crude anthracene and high grade anthracene rich in carbazol, whereby the carbazol content of these crude grades of anthracene is eliminated to a large extent or entirely by total combustion, and in some cases the phenanthrene content is also strongly attacked by total combustion so that the remaining anthracene contains, in most cases small amounts of phenanthrene as the only impurity.

The anthracene thus purified can easily be further purified when desired or necessary by well known methods e. g., by dissolving it in the minimum amount of solvent naphtha or other solvents which possess a solubility especially for phenanthrene at 80 to 100° C. The anthracene obtained from one recrystallization contains in many cases between 95 and 98% anthracene and is practically colorless. Such highly purified anthracene is very valuable especially in the dye-stuff industry.

Crude anthracene containing 30 to 35% anthracene uniformly vaporized with air in the ratio of about 1:20 and passed over such contact masses at 380 to 440° C. results in 70 to 80% anthracene containing practically no carbazol and the impurities which remain can be considered as phenanthrene. In the recrystallization of this product phenanthrene of a very high purity can be recovered from the solvent.

If high grades of anthracene are used in this process especially those which are freed to a large extent from phenanthrene but which contain large amounts of carbazol, 94 to 99% pure anthracene can be produced directly without recrystallization, by this catalytic process. The anthracene obtained is almost entirely white.

Instead of using these concentrated contact masses diluted catalysts with practically the same efficiency can be obtained by introducing kieselguhr, pumice meal, ground quartz, into the zeolite, especially during formation.

Contact masses coated on to artificial and natural carrier fragments such as pumice stones, quartz filter stones, in situ, or after formation of the zeolite with the help of alkali as binders are also effective catalysts for this process.

Instead of crude anthracene also other aromatic hydrocarbons can be purified in the same way especially crude naphthalene, using about the same reaction conditions as described with crude anthracene.

*Example 15*

The following mixtures are prepared:

1. 250 parts of freshly precipitated iron oxide are suspended in water to form a very dilute suspension and are then treated with 15 parts of bismuth chloride with vigorous agitation. The hydrolysis of the bismuth chloride can be accelerated by the addition of ammonia. The basic bismuth oxide which is precipitated is absorbed by the iron oxide and potassium or sodium waterglass solution of about 33° Bé. containing 42 to 54 parts of $SiO_2$ together with a small amount of ammonia are added to the suspension.

2. 30 parts of cupric nitrate plus $6H_2O$ are dissolved in about 400 parts of water and then 20 to 25% ammonia is added until the dark blue cuprammonium compound is formed.

3. 40 parts of ferric nitrate containing 9 mols of water are dissolved in water to form about a 20% solution.

The suspension 1 and the solution 2 are mixed together and then solution 3 is added gradually with vigorous agitation precipitating out a product from the reaction mixture which should remain alkaline.

After the gelatinous product has been washed and pressed it is given a subsequent washing with diluted potassium waterglass solution and then dried. For this purpose 1 part of a 33° Bé. potassium waterglass solution is dissolved in about 10 parts of water. After treatment the mass is dried and broken into fragments which are calcined with air at about 400° C. and then constitutes an excellent contact mass for the catalytic purification of organic substances wherein especially nitrogen-containing organic substances are totally burned in the presence of an oxygen-containing gas such as air. Crude anthracene containing from 20 to 50% anthracene, carbazol in large amounts, and, in addition to phenanthrene, oily substances, is passed over the contact mass, after being uniformly vaporized with air in the ratio of 1:20 to 1:40 at 380 to 440° C. A 65 to 85% anthracene is obtained containing only phenanthrene as the principal impurity which later can easily be removed by one recrystallization with a minimum amount of solvent naphtha at 80° C. The anthracene obtained after recrystallization shows, a purity of 95 to 97% by the Höchst method.

*Example 16*

Diluted and undiluted two and three component base exchange bodies and their saltlike bodies, and the other catalysts compositions as described in foregoing examples, can be coated on to massive carrier fragments of natural and artificial origin such as, for example, materials rich in silica, e. g. quartz fragments, quartz filter stones, sand stones, fragments of silica gel, diatomaceous stones, Celite bricks, pumice fragments, fragments of natural or artificial silicates with or without base exchanging properties, especially zeolites diluted with materials rich in silica, unglazed porcelain fragments, metals such as aluminum granules, metal alloys such as ferro-silicon, ferro-vanadium, ferro-chrome, and the like, particularly when their surface has been roughened.

The coating of these carrier materials can take place either after formation of the product or the formation can be caused to take place on the carrier fragments, the alkaline reacting components, e. g., the waterglass and metallate solutions being first coated onto carrier fragments and then the metal salt component solution sprayed on them, whereby the three component zeolite, which is a good adhesive, is fixed on the carrier fragments. The coating process can also be carried out in the reverse order.

Very suitable types of artificial carrier fragments can also be prepared, for example, by forming fragments of Celite, kieselguhr, pulverized quartz, pumice stones, silica gel, pulverized silicates and diluted or undiluted zeolites, using various adhesives such as waterglass, alkalies, or alkali metal salts followed by calcination preferably at 400 to 500° C. and if desired a treatment with inorganic acid such as sulfuric acid, nitric acid, phosphoric acid, hydrochloric acid and the like.

For the preparation of contact masses especially for the selective purification of crude anthracene by selective total combustion especially of carbazol, CaO, $Ca(OH)_2$, $CaO$-$NaOH$, or $CaO$-$KOH$ can be used which are excellent adhesive and at the same time act as activators in this process.

Other initial materials for the preparation of artificial carrier fragments can be used, such as, alkali, waterglass, mixtures of alkalies with alkline earths, greensand pretreated in various ways and then hydrated with water in order to improve its physical properties, especially its absorptive power which is very helpful in the selective catalytic oxidation of organic compounds.

A further voluminous carrier mass is produced by treating finely ground silica, such as, diatomaceous earth with lime in the presence of water with or without heat. Other oxides or hydroxides, such as, strontium may be used instead of lime. The product is then dried and pulverized or the wet mass may be calcined and carbonated during or after calcination. By this process a considerable amount of hydrated calcium metasilicate is produced which is a very useful diluent for the preparation of such catalytically active diluted zeolites and also for the preparation of artificial carrier fragments usable in these processes.

The ratio of coating is about 1 kilo by weight of diluted or undiluted base exchange bodies to 10 liters of pulverized carrier fragments.

Instead of introducing diluent bodies into the two and three component base exchange bodies during formation as described in foregoing examples, the undiluted base exchange bodies, after preparation, while still in the wet form, can be mixed mechanically in aqueous suspension with the diluent bodies, or, the base exchange bodies may be dried and pulverized and then mixed with the latter. In most cases 50 to 100 parts of diluents are sufficient and the mixture can be formed into granules with any of the above described adhesives especially alkali or waterglass.

The products thus produced are effective contact masses for the selective catalytic oxidation of many of the organic substances, as described in the foregoing examples under the reactions conditions there given.

Example 17

1. 6.6 parts of $Al_2O_3$, freshly precipitated, are dissolved in N.KOH solution in order to form the corresponding potassium aluminate. To this solution are added diluents rich in $SiO_2$ such as comminuted silicates, quartz, ground rocks, tuffs, lava of volcanic or eruptive origin, artificial and natural zeolites, kieselguhr, Celite or brick refuse. In using Celite brick refuse or kieselguhr 80 to 100 parts are the proper amount in order to prepare this diluted zeolite body.

Diluents of advantageous character can also be prepared by special means. Thus for example, diluents containing $SiO_2$ may consist of colloidal $SiO_2$ or the product from the treatment of natural or artificial base exchanging silicates with dilute mineral acids, which treatment removes both the exchangeable alkali metals and the amphoteric metal oxide and leaves an $SiO_2$ complex of highly absorptive physical structure. The silicious diluents thus prepared when mixed with Celite brick refuse or kieselguhr are of great value in the preparation of zeolite like contact masses to be used in the catalytic selective oxidation of organic compounds.

In some cases it is also advantageous to add 5 to 10% of specially prepared silicates which act in these processes very favorably. Such silicates are an intermediate step in the preparation of the complex $SiO_2$ from artificial and natural base exchanging silicates. Base exchanging silicates such as leucite or artificial zeolites as commonly prepared are leached out with diluted mineral acids such as 5 to 10% sulfuric acid, hydrochloric acid or nitric acid, in order to remove the alkali from the exchangeable part of the base exchange body, leaving the amphoteric metal oxide in chemical combination with the $SiO_2$ group. Such silicates have a very high absorptive power and are excellent means for tuning the stabilizer action of the stabilizers in complex combination with the catalytically active portions of the contact masses.

2. 80 parts of potassium waterglass solution with an approximate strength of 33° Bé. are dissolved in 100 parts of water.

3. 24 parts of $Al_2(SO_4)_3$ plus 18 aq. are dissolved in 150 parts of water.

The aluminate suspension 1 is quickly mixed with the waterglass solution with strong agitation and the aluminum sulphate solution is added in a thin stream whereby a diluted gelatinous three component base exchange body is obtained which contains $Al_2O_3$ and $SiO_2$ in the non-exchangeable part. The mother liquor of the base exchange body is removed in the usual way, the presscake obtained dried preferably below 100° C. and then the dried body is broken in suitable pieces. In order to increase the yield small amounts of very dilute $H_2SO_4$ (5%) may be used whereby care must be taken that the reaction product and the mother liquor remain substantially neutral or weakly alkaline to phenolphthalein.

Using the same amount of components, another type of three component zeolite can be obtained when the order, in which the three classes of components are reacting together, is changed. In this case the alkaline reacting components and the aluminate and waterglass solution are poured in the aluminum sulphate solution in which case the diluents may be present in the mixture of the alkaline components or in the metal salt component. The gelatinous mass obtained is worked up in the same way as before and dried.

The metal salt component and metallate component may first act together, the diluent body being preferably in one of these two components, and then the SiO component is added.

Instead of changing the order in which the three classes of components react together, the amount of the components may be changed whereby other types of three component zeolites are obtained which are also effective catalysts.

This is the case when the following percentage amounts of the components are used:

1. 3.4 parts of $Al_2O_3$, freshly precipitated, are dissolved in N.KOH solution in order to form the potassium aluminate solution as the metallate component.

2. 120 to 150 parts of potassium waterglass of 33° Bé. are dissolved in about 200 parts of water.

3. 44.5 parts of $Al_2(SO_4)_3$ plus 18 aq. are dissolved in about 200 parts of water.

The diluent is added to one or the other or to the mixture of the alkaline reacting components.

A special method for the preparation of these three component zeolites consists of mixing the aluminate and $SiO_2$ component together and then adding the aluminum sulfate component. This procedure can also be carried out in the reverse order.

The reaction product obtained is worked up in the usual way.

Instead of using for the metallate component $Al_2O_3$ other components of this class may be used which contain vanadium, tungsten, molybdenum, lead, zinc or cadmium, with or without aluminum, singly or in admixture.

Instead of using aluminum sulfate other metal salts, with or without aluminum sulfate, may be used singly or in admixture. Such salts may, for example, contain vanadium, especially vanadyl sulfate, zinc, cadmium, titanium, zirconium, copper, nickel, cobalt, silver, beryllium, cerium, tin, thorium, manganese, chromium or iron.

By these methods base exchange bodies can be obtained which are very effective for this specific catalysis.

The catalytic power may reside wholly in the three component zeolite or in chemical combination therewith or it may reside partly in the zeolite and partly in diluents combined therewith to form mixtures preferably of physical homogeneous structures. Catalytically active diluents may also be associated with these multi-component zeolites.

A diluted three component zeolite catalyst which contains aluminum and $SiO_2$ in the non-exchangeable part can be tuned or enhanced for specific action in several ways. The alkali metal in the exchangeable part of the base exchange body may be replaced partly or into the largest possible extent by other metals, especially the heavy metals, such as, iron, copper, nickel, cobalt, manganese, silver, also titanium, zirconium, aluminum, by trickling 5 to 10% solutions of the corresponding salts or their mixtures over it at ordinary temperatures or somewhat elevated temperatures in order to accelerate the base exchange. Before carrying out the base exchange it is advantageous in many cases to hydrate the base exchange body by trickling water over it. After this treatment the base exchange bodies are brought into reaction with ammonium vanadate or other soluble vanadates in order to form the vanadate of the base exchange body, the best method being to impregnate the base exchange body with the vanadate solution and the alkali being washed out after reaction. The base exchange body changes its color to that of the corresponding vanadates. For this purpose a 1 to 10% solution of the vanadate may be used.

Efficient contact masses for such purposes may also be prepared by introducing catalytically active diluents such as, 5 to 10% of the metallates of the 5th and 6th groups of the periodic system, especially silver vanadate, copper vanadate, manganese vanadate, iron vanadate, the corresponding tungstates, molybdates, uranates, tantalates, and their mixtures.

The modifications described in this example show that, many highly effective catalysts for the selective catalytic oxidation of organic compounds can be prepared according to the present invention, all the specific features in the properties of such contact masses which are necessary for successful operation being fully taken into account.

*Example 18*

Pea-sized quartz fragments are treated with about a 20% solution of hydrofluoric acid in order to roughen or etch the surface of the quartz fragments. A three component base exchange body containing platinum is formed on these carrier fragments, the amount of coating being preferably about 10% by volume. Instead of forming the base exchange body in situ on the fragments the finished three component base exchange body may be pulverized and then coated on the carrier fragments with the help of adhesives such as waterglass, magnesium sulphate, potassium hydroxide, sodium hydroxide, and the like. The base exchange body is prepared as follows:

1. 2 parts of $Al_2O_3$ are transformed in potassium aluminate using N. potassium hydroxide solution.
2. 40 parts of sodium waterglass solution of about 35° Bé are diluted with five volumes of water.
3. 4 parts of $H_2PtCl_6$ are prepared in a 2 to 5% solution.
4. 15 parts of $Fe_2(SO_4)_3$ 9 aq. are dissolved in about 100 parts of water.

The solutions 1 and 2 are poured together and then the mixture of the solutions 3 and 4 is poured in with vigorous agitation care being taken that the resulting three component base exchange body containing aluminum $SiO_2$, iron and platinum in non-exchangeable form remains alkaline to litmus or preferably neutral to phenolphthalein.

The base exchange body obtained is freed from the mother liquor by pressing and then dried. Before using this material it may advantageously be hydrated by trickling water over it until the water which drains off does not contain appreciable amounts of salts.

Instead of using an undiluted base exchange body a diluted base exchange body may be prepared, particularly one using powdered quartz, silicates or other materials rich in silica, such as colloidal $SiO_2$, kieselguhr, and the like, as diluents. A contact mass prepared with such a multi-component diluted base exchange body is an effective contact mass for the catalytic purification of crude anthracene, crude naphthalene and the like, many of the impurities being selectively burned out during the reaction as described in former examples.

*Example 19*

200 volume parts of sodium calcium hydrate of 8-mesh as obtained in the trade are mixed with 5 parts of NiCO₃ in the following way:

12.23 parts of Ni(NO₃)₂ plus 6H₂O are dissolved in 100 volume parts of water and NiCO₃ is precipitated out with a 5–10% NaCO₃ solution, filtered off, washed with 100 parts of water. The nickel carbonate obtained is then dissolved with 28% NH₄OH in excess whereby a blue solution is obtained. Necessary for dissolving are 200 volume parts of 28% ammonia water.

With this solution are impregnated the 200 volume parts of sodium calcium hydrate of 8-mesh. This mixture is then partly freed from water in an evaporating dish and finally dried in a drying oven at 120° C. and then broken in pieces of pea size. This contact mass filled in a converter and crude anthracene of 30% led over the catalyst after uniform vaporization with air in the ratio of 1:20 at 360–440° C. whereby a reaction product is obtained which contains between 62.05 to 71.31% pure anthracene, from 0–5% anthraquinone, from 7.14–2.92% carbazol; the rest is phenanthrene.

Instead of using sodium calcium hydrate, potassium calcium hydrate can also be used with great success.

Instead of nickel compounds, copper compounds, cobalt compounds, alone or in admixture in presence or absence of Al₂O₃, ThO₂, TiO₂. The ratio between the stabilizer, in this case sodium or potassium calcium hydrate, to the catalyst, in this case NiCO₃, can be varied in large limits, so especially the amount of catalyst can be multiplied several times.

Also very efficient catalysts for these specific reactions are obtained when the sodium calcium hydrate mixed with the catalyst is diluted especially with diluents rich in SiO₂ such as kieselguhr, silicates, glaucosil, zeolites, and so on.

*Example 20*

30 parts of Co(NO₃)₂+6H₂O are dissolved in 200–250 parts of water and 80 parts of infusorial earth are stirred in. With the aid of 2 N. KOH solution the cobalt oxide is precipitated out under agitation in the infusorial earth. This mixture is separated from the mother liquor by filtration.

90.5 parts of 33° Bé. waterglass are diluted with 10–15 volumes of water and the filter cake is added with vigorous stirring in order to obtain a uniform distribution. 60 parts of aluminum sulphate with 18 mols of water are dissolved in 200 parts of water and sufficient 5 N. potassium hydroxide solution is added to dissolve up the aluminum hydroxide which is at first precipitated, forming a potassium aluminate solution. The aluminate solution is then stirred into the suspension and the mixture heated up to about 60° C. A gelatinous precipitate is obtained very soon and is increased by the gradual addition of 2 N. sulfuric acid with agitation. Care should be taken, however, that a weak alkalinity to phenolphthalein is maintained. The stirring is continued for an hour, the mixture being gradually permitted to cool down to room temperature. The gelatinous precipitate obtained is pressed and washed with 200 parts of water in small portions. The presscake is then dried at about 80° C. and broken into fragments of suitable size. The contact mass obtained which consists of a zeolite diluted by infusorial earth and cobalt oxide is directly applicable for the catalytic purification of crude phenanthrene or crude anthracene.

Crude phenanthrene obtained by distilling off solvent naphtha from the mother liquors of the recrystallization of 30% crude anthracene, which phenanthrene contains about 8% anthracene, 10–12% carbazol, and 80–82% phenanthrene, is uniformly vaporized with air in the ratio of 1:30 and led over the catalyst at 380–420° C. A phenanthrene more than 90% purity is obtained, the anthracene being substantially the only impurity present as the carbazol is practically completely burned out. The yield is about 75% of the theory. In order to increase the yield of the phenanthrene, it is desirable to use gases which possess a lower oxygen content than air in a circulatory process in which the oxygen used up in the selective oxidation of the crude phenanthrene is added to the circulating gas stream, together with further amounts of phenanthrene, before the gases enter the catalytic chamber. Instead of using phenanthrene obtained from a solvent naphtha recrystallization a similar phenanthrene from a pyridine recrystallization of crude anthracene may be used with great success. The contact mass is also well suited for the catalytic purification of crude anthracene after the latter has been recrystallized from 30% anthracene by means of pyridine. An 80% anthracene is obtained, the remaining 20% being mainly carbazol. This partially purified crude anthracene is vaporized with air and led over the catalyst under about the same reaction conditions described above and yields a colorless product which is 99% pure anthracene.

The cobalt oxide of the contact mass may be substituted by other oxides or compounds of metals and instead of embedding the most effective catalytic component into the zeolite, it may be used as a reaction component in the formation of the zeolite.

Very effective catalysts may also be obtained when a mixture of aluminum salt and cobalt salt solutions in the right amounts are added to the waterglass solution, care being taken that the reaction product remains alkaline to phenolphthalein. Infusorial earth used as diluent in the contact mass is not essential and undiluted contact masses may also be used with good success.

Example 21

80 parts of neutral iron silicate obtained by the reaction of waterglass and ferric sulphate are stirred into 200 parts of 33° Bé. waterglass solution diluted with 400–600 parts of water. To this suspension is added a solution of ferric sulphate containing 24.6 parts $Fe_2(SO_4)_3$ plus $9H_2O$ dissolved in 250 parts of water, vigorous agitation being used and care being taken that the reaction product remains alkaline to phenolphthalein. The gel obtained is pressed in the usual way and dried at temperatures under 100° C. and constitutes an iron zeolite in which neutral iron silicate is embedded. This contact mass is broken up into small pieces and can then be directly used.

Crude naphthalene, especially products containing phenols is vaporized in air and led over the catalyst at 400° C., catalyst layer being preferably about 27 cm. high and the loading being 4 parts naphthalene to 20–25 volumes of air per 25 volumes of catalyst per hour. A practically colorless naphthalene is obtained.

The same contact mass can be used with similar reaction conditions to purify crude light oil or crude benzene or toluene fractions by selective oxidation of the impurities, particularly aliphatic hydrocarbons, such as pentane, hexane, amylene, hexylene, heptylene, octylene, etc., alicyclic compounds, such as cyclopentadiene, dicyclopentadiene, di- and tetrahydrobenzene, heterocyclic compounds such as pyrrol, pyridine, thiophene, thiotolene and other impurities such as phenols, etc.

Example 22

Natural or artificial zeolites, as commercially obtainable for water softening purposes, can be treated to exchange part of the exchangeable alkali metal oxides for heavy metal oxides. These contact masses when used under the reaction conditions described in the foregoing examples are well suited for the catalytic purification of crude aromatic compounds.

In some cases the zeolites may be replaced partly or wholly by corresponding neutral silicates which do not exchange their bases.

What is claimed as new is:

1. A method of purifying crude aromatic compounds capable of purification by selective catalytic oxidation, which comprises subjecting them to selective catalytic oxidation in the presence of a catalyst which has associated therewith at least one compound of a metal falling within the group consisting of alkali metals, alkaline earth metals and strongly basic earth metals whose oxides are not reducible by hydrogen and which favors oxidation of at least part of the impurities and does not favor the oxidation of organic compounds to be purified, the oxygen-containing gas being in sufficient excess and the temperature and loading being sufficiently low so as to substantially prevent considerable oxidation of the aromatic compound to be purified.

2. A method of purifying crude aromatic compounds capable of purification by selective catalytic oxidation, which comprises subjecting them to selective catalytic oxidation in the presence of a catalyst containing at least one base exchange body, and which favors oxidation of at least part of the impurities.

3. A method of purifying crude aromatic compounds capable of purification by selective catalytic oxidation, which comprises subjecting them to selective catalytic oxidation in the presence of a catalyst which favors oxidation of at least a part of the impurities, and does not favor the oxidation of organic compounds to be purified, the oxygen containing gas being in sufficient excess and the temperature and loading being sufficiently low so as to substantially prevent considerable oxidation of the aromatic compounds to be purified, said catalyst containing at least one catalytic compound selected from a group of catalytic compounds consisting of the third, fourth and eighth groups of the periodic system.

4. A method of purifying crude aromatic compounds capable of purification by selective catalytic oxidation, which comprises subjecting them to selective catalytic oxidation in the presence of a catalyst which favors oxidation of at least a part of the impurities, and does not favor the oxidation of organic compounds to be purified, the oxygen containing gas being in sufficient excess and the temperature and loading being sufficiently low so as to substantially prevent considerable oxidation of the aromatic compounds to be purified, said catalyst containing at least one catalytic compound of an element of the third, fourth and eighth groups of the periodic system and which is free from metal elements of the fifth and sixth groups of the periodic system.

5. A method of purifying aromatic compounds containing considerable amounts of heterocyclic nitrogenous compounds relative to the amount of aromatic compounds to be purified, at least part of which are capable of removal by selective catalytic oxidation, which comprises subjecting the crude product to vapor phase catalytic oxidation in the presence of catalysts which favor the oxidation of nitrogenous heterocyclic compounds, but which are relatively weak catalysts for the catalytic oxidation of the aromatic compounds.

6. A method of purifying aromatic compounds containing relative to the amount of aromatic compounds to be purified considerable amounts of heterocyclic nitrogenous compounds, at least part of which are capable of removal by selective catalytic oxidation which comprises subjecting the crude product to vapor phase catalytic oxidation in the presence of catalysts which favor the oxidation of nitrogenous heterocyclic compounds, said catalysts having associated therewith at least one compound of a metal falling within the group consisting of alkali metals, alkaline earth metals and strongly basic earth metals whose oxides are not reducible by hydrogen, but which are relatively weak catalysts for the catalytic oxidation of the aromatic compounds.

7. A method according to claim 6, in which the amount of compound of a metal falling within the group consisting of alkali metals, alkaline earth metals and strongly basic earth metals whose oxides are not reducible by hydrogen is greater than the amount of catalystic elements.

8. A method of purifying crude anthracene, which comprises subjecting it to the vapor phase catalytic oxidation in the presence of a catalyst which promotes oxidation of carbazol, but which is a relatively weak catalyst for the oxidation of anthracene.

9. A method of purifying crude anthracene, which comprises subjecting it to the vapor phase catalytic oxidation in the presence of a catalyst having associated therewith at least one compound of a metal falling within the group consisting of alkali metals, alkaline earth metals and strongly basic earth metals whose oxides are not reducible by hydrogen which promotes oxidation of carbazol, but which is a relatively weak catalyst for the oxidation of anthracene.

10. A method of purifying anthracene which contains considerable amounts of carbazol, which comprises subjecting the product to vapor phase catalytic oxidation in the presence of a catalyst which permits oxidation of carbazol but which does not favor the oxidation of anthracene.

11. A method of producing anthracene of high chemical purity from crude anthracene, which comprises subjecting the crude anthracene to vapor phase catalytic oxidation in the presence of catalysts favoring oxidation of carbazol, but which do not favor the oxidation of anthracene, and also to the selective solvent action of solvents having widely different solvent powers for anthracene and phenanthrene at at least some temperatures.

12. A method of producing highly purified anthracene from crude anthracene, which comprises subjecting the crude anthracene to the vapor phase catalytic oxidation in the presence of catalysts favoring the oxidation of carbazol, but which are relatively weak catalysts for the oxidation of anthracene to anthraquinone, and subjecting the partially purified anthracene obtained, which contains as its main impurity phenanthrene, to recrystallization from a coal tar solvent, which at low temperatures possesses a greater solvent power for phenanthrene than for anthracene.

13. A method of purifying crude anthracene, which comprises subjecting the anthracene to a treatment with a solvent capable of removing the phenanthrene, whereby a partially purified anthracene is obtained containing carbazol as its main impurity, and subjecting the crude anthracene thus obtained to the vapor phase catalytic oxidation in the presence of a catalyst favoring the oxidation of carbazol, but which is not active in the oxidation of anthracene.

14. A method of purifying crude anthracene, which comprises subjecting it to a treatment with a solvent having the solvent characteristics of pyridine bases, whereby anthracene contaminated with carbazol and minor amounts of phenanthrene are removed, and subjecting this partially purified crude anthracene to a catalytic vapor phase oxidation in the presence of a catalyst which favors the oxidation of carbazol, but which is not strongly active in the oxidation of anthracene.

Signed at Pittsburgh, Pennsylvania, this 18th day of October, 1927.

ALPHONS O. JAEGER.